United States Patent
Carberry et al.

[15] 3,655,224
[45] Apr. 11, 1972

[54] MULTI-PLY BELLOWS STRUCTURE WITH FLUID PERVIOUS SPACER

[72] Inventors: John L. Carberry, Memphis, Ind.; David C. Carson, Sr.; Edward F. Harrington, both of Louisville, Ky.

[73] Assignee: Chemetron Corporation, Chicago, Ill.

[22] Filed: May 6, 1969

[21] Appl. No.: 822,166

[52] U.S. Cl.................................285/93, 138/121, 285/226
[51] Int. Cl..........................................................F16l 35/00
[58] Field of Search....................285/226, 224, 93, 144, 133; 138/121, 122; 340/242

[56] References Cited

UNITED STATES PATENTS 2,785,382   3/1957   Lomb..............................138/121 X Primary Examiner—Dave W. Arola
Attorney—Woodcock, Washburn, Kurtz & Mackiewicz

[57] ABSTRACT

A bellows structure adapted to be connected between two parts of a fluid conduit system to serve as a flexible and expansible joint including a multi-ply bellows element having concentric inner and outer plies each of which is comprised of a flexible circumferentially corrugated thin-walled tube of fluid impervious material, the outer one of the plies having one or more ports therethrough communicating with space between the plies and adapted for connection therewith of means for monitoring or controlling fluid pressure or flow in the space, and spacer structure in the form of a fluid pervious screen-like meshwork positioned in the space between the plies affording passages for flow of fluid through the space to or from the port or ports.

2 Claims, 2 Drawing Figures

Patented April 11, 1972

3,655,224 a# MULTI-PLY BELLOWS STRUCTURE WITH FLUID PERVIOUS SPACER

FIELD OF INVENTION

The present invention is directed to a multi-ply bellows structure adapted to be connected between two parts of a fluid conduit system to serve as a flexible and expansible joint wherein the outer one of the plies is provided with one or more ports therethrough communicating with space between the plies and adapted for connection therewith of means for monitoring or controlling fluid pressure or flow in the space.

Devices employing the present invention may be used as piping components for nuclear power plants to simplify leak detection of radioactive contaminants. Such devices also have application in other industries to guard against leakage of toxic gases or expensive process materials or catalysts. Among the advantages, in addition to the safety function of signalling leakage of harmful or costly fluids, are that systems employing such devices, both in nuclear power plant and other applications, may be employed to reduce the frequency of plant-wide leakage rate tests that may halt normal operations for several days, and in the case of failure of one ply but not the other, to give advance warning so that a replacement may be obtained and installed to avoid later extended periods of costly plant shut-down. Devices of the present invention also may have application in so-called "steam tracing" piping systems wherein a material which tends to harden on reduction of temperature flows through the inner conduit, and a heating fluid, such as steam, is introduced into the space between the inner and outer conduits to either maintain fluidity of the process material or to melt hardened deposits of that material.

Although, as above indicated, the present invention may be advantageously employed in various applications, it will for purposes of illustration be described in reference particularly to detection of leakage in nuclear reactor systems.

PRIOR ART

In nuclear power plants and other systems employing nuclear reactors it has been the practice to provide nuclear reactor containment vessels to prevent radioactive contaminants from entering the atmosphere and contaminating large areas in the event they are accidentally released from the reactor system. A large array of piping, cables, air locks, etc., must penetrate the containment vessel as a consequence of its operation. Such penetrations present sealing problems in maintaining the overall leakage rate of the containment vessel at a suitably low level. Since absolute leak tightness is a physical impossibility, certain measures have been employed to monitor potential leakage points. One such point is the piping penetrations.

Various methods of sealing have been utilized including the use of double walled conduit structures to provide a double barrier to the release of radioactive contaminents. Such double barrier may be obtained by the use of two concentric expansion bellows in radially spaced relationship or by the use of a single two-ply laminated expansion bellows. In such cases, the annular space between the two concentric bellows or between the plies of the laminated bellows may be such as to serve as a test chamber, with monitoring or control of fluid pressure or flow in the chamber so as to detect a leak in either the inner or outer bellows or ply. One suggested prior art arrangement was to employ a two-ply bellows element with the contiguous surfaces of the plies in substantially continuous surface contact and sealed together at opposite ends. A suggested variation of this latter arrangement was to use a thin foil layer inserted between the plies to act as a cushion and improve the resistance of the outer ply to breaks caused by mechanical action. While some of such prior art arrangements have been used, nevertheless, they have presented certain problems. In arrangements where the two plies are in contact with each other or in contact with a foil layer, there exists the problem that such contact may form a complete or partial line seal and cause leak detection to be either impossible or very costly in terms of sensitive monitoring equipment.

The present invention eliminates such possibility of a complete or partial line seal between the plies, assuring positive maintenance of an effective path for flow of fluid in the space between the plies so as to provide greater certainty of leak detection and permit employment of less sensitive and costly equipment.

SUMMARY OF INVENTION

The present invention is directed to a bellows structure adapted to be connected between two parts of a fluid conduit system to serve as a flexible and expansible joint. The invention comprises a multi-ply bellows element having concentric inner and outer plies each of which is comprised of a flexible circumferentially corrugated thin-walled tube of fluid impervious material, and the respective corrugations of which tubes are in radial registry and closely interfitting nested relationship with each other. Means are provided for affording fluid-tight sealing joints between the inner and outer plies entirely around the circumference thereof adjacent their respective opposite ends, and spacer structure is interposed between these plies and extends in closely interfitting contacting relationship with both of the plies throughout substantially the whole of their length between the sealing joints to positively maintain close but finite spacing between the plies. The outer one of the plies is provided with one or more ports therethrough communicating with the space between the plies and adapted for connection therewith of means for monitoring or controlling fluid pressure or flow in the space, the spacer structure comprising a fluid pervious screen-like meshwork affording passages for flow of fluid through the space to or from the port or ports.

For a more detailed explanation of the invention and for further objects and advantages thereof, reference is to be had to the following description taken in conjunction with the accompanying drawings.

DESCRIPTION OF PREFERRED EMBODIMENTS OF THE INVENTION

Figure 1:
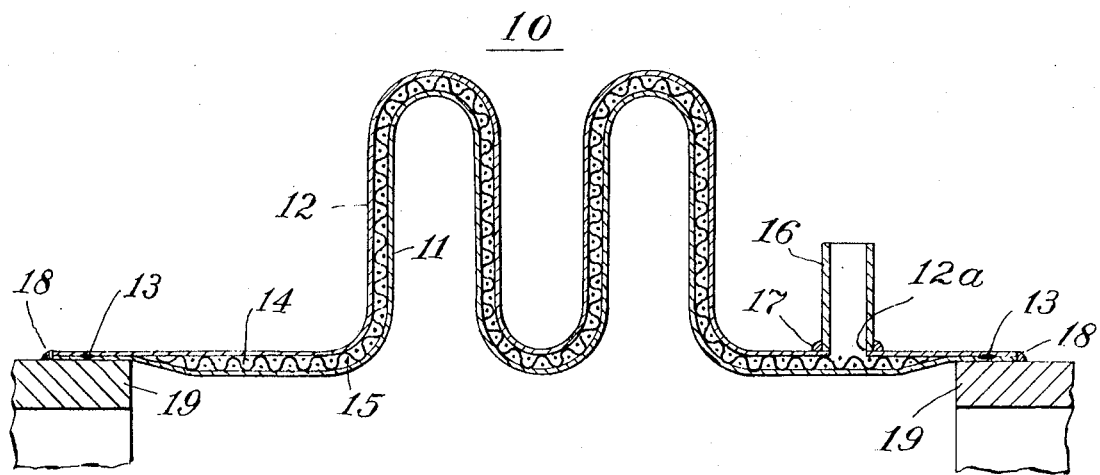
FIG. 1 is a longitudinal sectional view through a bellows structure of an expansion joint embodying the present invention.

Referring to FIG. 1 there is illustrated a bellows structure adapted to be connected between two parts of a fluid conduit system to serve as a flexible and expansible joint. Such bellows structure 10 comprises a multi-ply bellows element having concentric inner and outer plies 11 and 12 respectively, each of which is comprised of a flexible circumferentially corrugated thin-walled tube of fluid impervious material. The type of material selected for the inner and outer plies of the bellows will depend upon the operating conditions and the fluid to be handled by the conduit system. As may be seen in FIG. 1, the respective corrugations of the plies or tubes 11 and 12 are in radial registry and closely interfitting nested relationship with each other. The circumferentially extending welds 13 provide fluid-tight sealing joints between the plies 11 and 12 entirely around the circumference thereof adjacent their respective opposite ends. The space 14 between the adjacent surfaces of the plies 11 and 12 is provided with spacer structure 15 interposed between the plies and extending in closely interfitting contacting relationship with both of the plies throughout substantially the whole of their length between the sealing welds 13 to positively maintain close but finite spacing between the plies 11 and 12. As shown on the drawing, the thickness of spacer structure 15 is greatly exaggerated for purposes of illustration; actually, it usually will be thinner than the material of plies 11 and 12.

The outer one of the plies 12 as shown in FIG. 1 is provided with an opening 12a therethrough and to which a pressure connection 16 is welded at 17 to provide a port for communicating with the space 14 between the plies 11 and 12. In order to avoid imposing stresses on the corrugations, pressure connection 16 is located in the tangent, or cylindrical, end portion of the bellows element between the adjacent sealing weld 13 and the first adjacent corrugation. The pressure connection 16 is adapted for connection with suitable means (now shown) for monitoring and/or controlling fluid pressure and/or flow in the space 14. The annular space 14 between the plies 11 and 12 may be evacuated or it may be subjected to atmospheric or superatmospheric pressure. To monitor the fluid pressure in the space 14 and thereby detect leaks into that space, a suitable pressure sensitive gauge may be connected to the pressure connection 16, or an external source of fluid with associated pressure sensitive means may be connected to the pressure connection for control and monitoring of the pressure in space 14.

The spacer structure 15 positioned within the annular spacing 14 comprises a fluid pervious screen-like meshwork affording passages for flow of fluid through the space to or from the port 16. In the embodiment illustrated in FIG. 1, the screen-like meshwork 15 is a woven wire mesh of over and under woven wires. The wire mesh can be rolled and formed from sheet stock into a tube in any suitable manner. The wires of the meshwork may be at right angles to each other and extend parallel and perpendicular to the axis of the bellows structure but preferably the wires extend on a bias with respect to the axis. Utilizing a bias arrangement of the wires relative to the axis of the finished bellows reduces the possibility of wire breakage during forming of the multi-ply bellows element and hence facilitates forming as well as providing for greater flexibility of the bellows in operation.

The meshwork may take other suitable forms. For example, it may take the form of a screen-like construction with all the wires of one course on one side of the wires of another course, or a braided wire construction. Additionally, the meshwork may comprise strips of wire mesh or screen extending longitudinally in circumferentially spaced relation, as distinguished from a complete cylinder. Further possible arrangements include the use of wires or cords of metal, glass fiber or other relatively rigid material extending longitudinally in circumferentially spaced relation or helically wrapped around the inner bellows ply to produce the open meshwork characteristic for the spacer structure ply 15 positioned between the two solid inner and outer plies 11 and 12.

Likewise the tubular plies 11 and 12 may be formed in any suitable and well known manner. After assembly of the tubular plies in concentric telescoped relationship with the wire mesh interposed therebetween, the convolutions in the bellows element may be formed in any suitable manner, either hydraulically or mechanically. For connecting the bellows structure 10 into a fluid conduit system, the opposite ends of the bellows element are joined, as by circumferential welds indicated at 18, to suitable elements, such as for example nipples 19, for purposes of connection to piping or other components in the system. In the embodiment illustrated in FIG. 1, nipples 19 are positioned within the ends of the bellows element. With care in the formation of welds 18, they may serve not only for attachment of the bellows element to the nipples but also for sealing together the ends of plies 11 and 12, in which case the seal welds 13 may be dispensed with.

Figure 2:
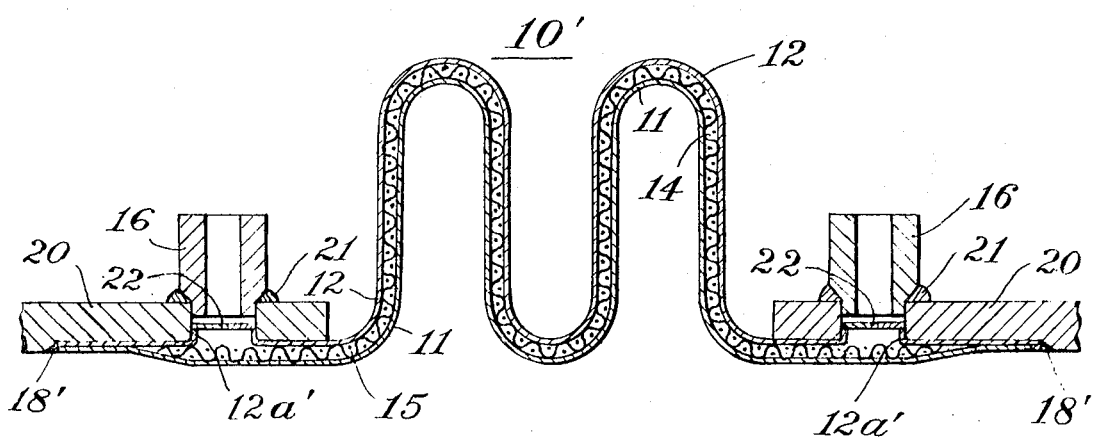
FIG. 2 is a longitudinal sectional view through a bellows structure of an expansion joint which is a modification of the invention.

Referring to FIG. 2, the bellows structure 10' is similar in construction to the bellows structure 10 illustrated in FIG. 1 and corresponding parts have been provided with corresponding reference characters. In the construction of this modification, however, the nipples 20, 20 are positioned on the outside of the ends of the bellows element rather than on the inside as shown in FIG. 1. The interior walls of the nipples are counterbored to provide sockets to receive the tangent, or cylindrical, end portions of the bellows element. The ends of plies 11 and 12 are joined to the nipples by internal welds 18' extending around the entire circumference of the ends of the bellows element, these welds serving not only for attaching the bellows element to the nipples but also for sealing the ends of the space between the plies. Additionally, pressure connections or couplings 16 are provided at both ends of the bellows structure 10', each of the pressure connections or couplings being located between one of the seal welds 18' and the first adjacent corrugation. Each pressure connection or coupling 16 has a reduced diameter end portion which fits into an opening in the associated nipple 20, 20, and an external circumferential weld 21 joins and seals the pressure connection to the nipple. The outer ply 12 of the bellows element has outwardly pulled rimmed ports 12a' located so as to be in axial registry with the pressure connections 16. These ports extend into the openings in the nipples and are seal welded completely around their peripheries, as indicated at 22, to the walls of the nipple openings.

The use of a pair of pressure connections 16 located at opposite ends of the bellows structure, as in FIG. 2, is particularly desirable for producing and controlling and/or monitoring fluid flow or for controlling and/or monitoring fluid pressure in the annular space 14. By monitoring and/or controlling the fluid pressure or flow in the annular space 14, a leak may be detected in either the inner or outer ply of the multi-ply bellows element.

Although in FIG. 1 there is shown only one pressure connection 16, located at one end of the bellows structure 10, and in FIG. 2 there are shown only two pressure connections 16, located respectively at opposite ends of the bellows structure 10', it will be understood that if desired in either case a plurality of such pressure connections may be provided in circumferentially spaced relationship around the bellows structure.

Flow tests have been made on bellows structures constructed in accordance with the present invention, and, for comparative purposes, on bellows structures including two plies with their contiguous surfaces in contact (i.e., no spacer structure between the plies). The following is a table of data obtained from such tests.

| Test No. | Nom. size (diam.- inches) | Internal pressure (p.s.i.g.) | Annulus pressure (p.s.i.g.) | Annulus flow rate (ml./5 min.) | Meshwork between plies |
|---|---|---|---|---|---|
| 1 | 6 | 0 | 3 | 4 | No. |
| 2 | 6 | 50 | 3 | 1 | No. |
| 3 | 6 | 0 | 3 | 1740 | Yes. |
| 4 | 6 | 50 | 3 | 1720 | Yes. |
| 5 | 6 | 0 | 3 | 14,300 | Yes. |
| 6 | 22 | 0 | 3 | 12.5 | No. |
| 7 | 22 | 0 | 8 | 18.5 | No. |
| 8 | 22 | 0 | 2 | 8,000 | Yes. |
| 9 | 22 | 0 | 2 | 22,500 | Yes. |

The foregoing test data reveal that bellows structures constructed in accordance with the present invention had flow rates which greatly exceeded the flow rates of comparable two-ply bellows without spacer structure between the plies.

For example, comparing tests 1 and 3, it will be seen that both bellows structures had the same nominal diameter, namely 6 inches, both had an internal pressure in the bellows structure of 0 psig (i.e., atmospheric), and an annulus pressure in the space 14 between the plies of 3 psig. The bellows element of test 1 did not have any meshwork between the inner and outer plies while the bellows element of test 3 did have such meshwork. The specimen of test 1 had an annulus flow rate of only 4 milliliters per 5 minutes, whereas the specimen of test 3, which included the meshwork between the plies, had an annulus flow rate of 1,740 milliliters per 5 minutes. Thus, the annulus flow rate of the test 3 specimen, with the meshwork between the plies, exceeded the flow rate of the test 1 specimen, without the spacer, by a factor of 1,740/4, or 435.

Comparing test 1 with test 5, it will be seen that both test specimens had the same size diameter, the same internal pressure and the same annulus pressure. However, the test 5 specimen included meshwork between the inner and outer plies. The ratio of the annulus flow rates in the two tests shows that the flow rate of the test 5 specimen exceeded the flow rate of the test 1 specimen by a factor of 14,300/4, or 3,575.

Comparing tests 2 and 4, it will be seen from the test data that they both had the same nominal diameter, 6 inches, and both had an internal pressure in the bellows structure of 50 psig and an annulus pressure of 3 psig. The test 2 specimen did not have any meshwork or other spacer structure between the plies, whereas the test 4 specimen did include meshwork between the plies. The flow rate of the test 4 specimen with the meshwork exceeded the flow rate of the test 2 specimen without the meshwork by a factor of 1,720/1, or 1,720.

The specimens employed in tests 6–9 were of a larger size, having a nominal diameter of 22 inches. All of these specimens were tested at 0 psig (atmospheric) internal pressure. Comparing the test 6 specimen, which had an annulus pressure of 3 psig, with the test 8 specimen, which had an even smaller annulus pressure, 2 psig, and included meshwork between the plies, the annulus flow rate for the test 8 specimen exceeded the flow rate for the test 6 specimen by a factor of 8,000/12.5, or 640.

Comparing tests 7 and 9, it will be seen that the test 9 specimen included meshwork spacer structure between the plies whereas the test 7 specimen did not, and the annulus flow rate of the test 9 specimen exceeded the flow rate of the test 7 specimen by a factor of 22,500/18.5, or 1,216, even though the annulus pressure in test 9 was only one-fourth that employed in test 7.

The test data further revealed that the screen-like meshwork spacer material 15 between the inner and outer plies not only allowed a considerably larger flow rate in the annular space between the plies but such spacer material also greatly reduced the tendency toward restriction of the annulus space flow path upon subjection of the bellows structure to internal pressure. For example, when the bellows specimen employed in tests 1 and 2, and which did not have any spacer structure in the annulus space between the plies, was subjected to an internal pressure of 0 pwig (atmospheric), the annulus flow rate was 4 ml./5 Min., whereas when the interior of the specimen was subjected to a pressure of 50 psig, which would tend to force the inner ply into closer contact with the outer ply, the annulus flow rate decreased to 1 ml./5 Min., a reduction of 75 percent, indicating that a very substantial restriction of the annulus flow path occurred upon the increase in internal pressure. On the other hand, when the bellows specimen employed in tests 3 and 4, and which had the meshwork spacer between plies, was subjected to a like increase of 50 psig in internal pressure, the annulus flow rate fell only 20 ml. from the initial rate of 1,740 ml., a relatively negligible decrease at that magnitude of flow.

From the above table of test data, it will be noted that tests Nos. 1, 2, 6 and 7, were made with specimens which did not include meshwork between the plies and the annulus flow rates were extremely low. With such low flow rates it is extremely difficult or, in some cases, practically impossible to detect leaks in the plies and, where it is possible to detect such leaks, an undesirable time delay in such detection will be present. Furthermore, with flow rates as low as 1 to 20 ml./5 Min., it would be necessary to utilize extremely sensitive monitoring equipment which in turn would be relatively high in cost as compared to equipment normally employed for use with flow rates in the order of 1,000 ml./5 Min. and above.

The results of the test program, as exemplified by the data above tabulated and discussed, show that much less restriction to flow in the annular space between the plies is obtained with bellows structures of the present invention, employing the meshwork separator (tests 3, 4, 5, 8 and 9) than with multi-ply bellows structures wherein the plies are in contact (tests 1, 2, 6 and 7). It is evident that structures employing such meshwork separator make it possible to detect very small leaks in the plies and permit a more rapid and more positive detection of leaks in either the inner or outer plies. The meshwork separator, by reason of its open work construction, provides a positive flow path from one end of the structure to the other, thereby greatly increasing the ability to detect even very small leaks in either ply of the bellows and provides greater assurance of safety and reduces the need for costly sensing equipment.

By maintaining a positive flow path in the space between the inner and outer plies of the bellows, the bellows construction of the present invention utilizing meshwork spacer structure also is suitable for applications such as stream tracing, etc.

Cyclic fatigue tests of bellows structures constructed in accordance with the present invention revealed that the presence of the wire mesh between the plies had no detrimental effect on fatigue life.

It is to be understood that the inner and outer solid plies of the bellows structure may be made of any suitable materials including metals or plastics or any combinations thereof depending upon the application. For example, in systems which are required to handle corrosive fluids, material such as "Teflon" may be utilized. Various examples of suitable materials which may be used for the plies include by way of illustration but not limitation, stainless steel, Monel, Inconel, Tantalum, Titanium, Hastelloy, etc. The screen-like meshwork positioned between the solid inner and outer plies may likewise be made from various suitable materials, such for example, as materials which are suitable for the solid plies. In the specific examples identified in the preceding test data the bellows structure employed in tests 3 and 4, was provided with aluminum mesh spacer material having a 16 × 16 grid of 0.012 inch diameter aluminum wire. The bellows structure of test 5 included a meshwork separator of Type 304 stainless steel consisting of a 30 × 30 grid of 0.010 inch diameter wire. The meshwork of the bellows structure used in tests 8 and 9 was also of Type 304 stainless steel and consisted of a 40 × 40 grid of 0.008 inch diameter wire.

What is claimed is:

1. A bellows structure adapted to be connected between two parts of a fluid conduit system to serve as a flexible and expansible joint, comprising:

a multi-ply bellows element having concentric inner and outer plies, each of which is comprised of a flexible circumferentially corrugated thin-walled tube of fluid impervious material, and the respective corrugations of which tubes are in radial registry and closely interfitting nested relationship with each other, means providing fluid-tight sealing joints between said plies entirely around the circumference thereof adjacent their respective opposite ends, and spacer structure interposed between said plies and extending in closely interfitting contacting relationship with both of the plies throughout substantially the whole of their length between said joint means to positively maintain close but finite spacing between the plies, the outer one of the plies having a port therethrough communicating with the space between the plies and adapted for connection therewith of means for monitoring or controlling fluid pressure in said space, and said spacer structure comprising a fluid pervious screen-like meshwork affording passages for flow of fluid through said space to or from said port, said screen-like meshwork comprising a plurality of wires which extend on a bias with respect to the axis of said bellows structure.

2. A bellows structure adapted to be connected between two parts of a fluid conduit system to serve as a flexible and expansible joint comprising:

three concentric circumferentially corrugated tubular elements telescoped together to form a multi-walled conduit with the respective corrugations of said elements in radial registry and closely interfitting nested relationship with each other, the innermost and outermost ones of said elements being comprised of thin fluid impervious material and being connected together adjacent their opposite ends by fluid tight sealing joint means extending entirely around the circumference of the elements, the third one of said tubular elements extending between said outermost and innermost elements in closely interfitting contacting relationship therewith throughout substantially the whole of the length of the elements between said joint means to positively maintain a close but finite spacing between said outermost and innermost plies, the outermost ply having a port therethrough communicating with the space between the plies and adapted for connection therewith of means for monitoring or controlling fluid pressure in said space, and said third tubular element being comprised of a fluid pervious screen-like meshwork affording passages for flow of fluid through said space to or from said port, said screen-like meshwork comprising a plurality of wires which extend on a bias with respect to the axis of said bellows structure.

* * * * *